United States Patent Office 3,528,990
Patented Sept. 15, 1970

3,528,990
1-AMINOALKYL DERIVATIVES OF 2,1-BENZISOTHIAZOLINE
Joseph A. Skorcz, Milwaukee, and John T. Suh and Claude I. Judd, Mequon, Wis., assignors to Colgate-Palmolive Company, New York, N.Y., a corporation of Delaware
No Drawing. Continuation-in-part of application Ser. No. 571,978, Aug. 12, 1966. This application Nov. 14, 1967, Ser. No. 682,977
Int. Cl. C07d 91/44
U.S. Cl. 260—304         9 Claims

ABSTRACT OF THE DISCLOSURE

The compounds are 1-aminoalkyl derivatives of 2,1-benzisothiazoline-2,2-dioxides which are useful in the preparation of wood preservatives, moth proofing agents, pickling inhibitors and as pharmaceutical agents, particularly central nervous system stimulants and antihypertensive agents. Among the compounds disclosed are 1-(2-dimethylaminoethyl) - 2,1 - benzisothiazoline-2,2-dioxide and 1 - (3 - dimethylaminopropyl)-3-phenyl - 2,1-benzisothiazoline-2,2-dioxide.

---

The present application is a continuation-in-part of our copending application Ser. No. 571,978, filed Aug. 12, 1966, now abandoned.

SUMMARY OF THE INVENTION

The present invention relates to novel 1-aminoalkyl-2,1-benzisothiazoline-2,2-dioxides, methods of preparing such compounds and compositions containing them.

DETAILED DESCRIPTION

The novel compounds of the present invention may be represented by the following formula:

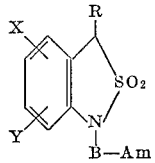

in which X and Y are selected from hydrogen, lower alkyl of 1 to 4 carbon atoms such as methyl, ethyl, isopropyl, butyl or propyl, lower alkoxy such as methoxy, ethoxy and propoxy, aralkoxy such as benzyloxy, nitro, halogen such as bromo or chloro and trifluoromethyl; R is selected from hydrogen, a lower alkyl of 1 to 4 carbon atoms such as methyl, ethyl, propyl, isopropyl or butyl, a cycloalkyl of 3 to 7 carbon atoms such as cyclopropyl, cyclobutyl, cyclopentyl or cyclohexyl, a cycloalkyl-lower alkyl in which the cycloalkyl has 3 to 7 carbon atoms such as cyclopropyl-methyl, cyclopentyl-methyl and cyclohexyl-ethyl, phenyl, a nuclear-substituted phenyl, particularly a lower alkoxy-substituted phenyl such as methoxyphenyl, or an aralkyl of 7 to 13 carbon atoms, particularly a phenyl-lower alkyl such as benzyl or phenethyl; B is a single chemical bond or a straight or branched chain alkylene of 1 to 6 carbon atoms such as ethylene, isopropylene or propylene and Am is a heterocyclic amine group such as morpholino, piperazino, pyrrolidino, piperidino, N-lower alkyl-piperazino such as N-methyl-piperazino or N-ethyl-piperazino, N-phenyl lower alkyl piperazino such as N-phenyl-ethyl piperazino and N-hydroxy-lower alkyl piperazino such as N-hydroxyethyl piperazino or Am may be

in which $R_1$ and $R_2$ may be hydrogen, lower alkyl of 1 to 8 carbon atoms or phenyl-lower alkyl such as benzyl, phenyl-ethyl, phenyl-isopropyl and phenyl butyl, and groups in which $R_1$ and $R_2$ are joined together to form amino groups in which the nitrogen is part of a cyclic group such as morpholino, pyrrolidino, piperidino, 1,2, 3,4-tetrahydroisoquinolino, 1,2,3,4-tetrahydroquinolino, a 4-lower alkyl-1-piperazino such as 4-methyl-1-piperazino, N-phenyl-lower alkyl piperazino or N-hydroxy-lower alkyl piperazino, or Am is a cyclic amine group bonded through a nuclear carbon to B, including such groups as N-lower alkyl-2,3 or 4-piperidyls such as N-methyl-3-piperidyl, N-ethyl-4-piperidyl, N-ethyl-2-piperidyl and N-isopropyl-3-piperidyl, N - (di - lower alkyl amino-lower alkyl)-2,3 or 4-piperidyls such as N-(beta-dimethylaminopropyl)-4-piperidyl, N-(beta-diethylaminoethyl)-3-piperidyl and N-(beta-dimethylaminopropyl)-2-piperidyl, N-phenyl-lower alkyl-3 or 4-piperidyls such as N-benzyl-3-piperidyl, N-phenylethyl-4-piperidyl and N-phenyl-propyl-3-piperidyl, 2-piperidyl, 3-piperidyl and 4-piperidyl, 2-pyrrolidyl, 3-pyrrolidyl, N-lower alkyl-2 or 3-pyrrolidyls such as N-methyl-2-pyrrolidyl, N-ethyl-3-pyrrolidyl, N-propyl-4-pyrrolidyl, N-phenyl-lower alkyl-2 or 3-pyrrolidyls such as N-benzyl-2-pyrrolidyl and N-phenylethyl-3-pyrrolidyl and 3-quinuclidyl. Provided, however, that in each instance there is at least 2 carbon atoms between the nitrogen atoms of the benzisothiazoline ring structure and Am, respectively.

The compounds of the present invention in which Am is

and $R_1$ and $R_2$ are other than hydrogen, may be conveniently prepared by treating a halomethanesulfonanilide such as o-chloromethanesulfonanilide or m-bromomethanesulfonanilide with an aminoalkyl ester in the presence of a base of sufficient strength to generate the desired anion such as an alkali metal amide, e.g. sodium amide, to form the corresponding sulfonanilide. The sulfonanilide derivative is then treated with a non-participating strong base such as an alkali amide in an inert reaction medium such as liquid ammonia, anhydrous ether, benzene or the like, to form the corresponding 1-(aminoalkyl)-2,1-benzisothiazoline-2,2-dioxide. Although other bases such as phenyl lithium, butyl lithium and potassium t butoxide can be employed in the above process, the alkali amides are preferred.

The above process may be diagrammed as follows:

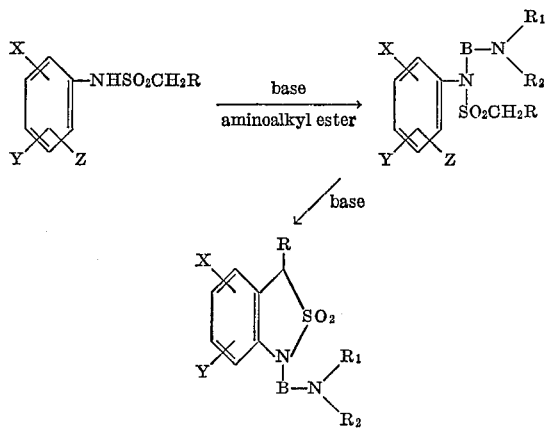

wherein Z is chloro or bromo, $R_1$ and $R_2$ are not hydrogen, and X and Y are other than halogen and groups which do not partake in or interfere with the reaction.

Representative of the aminoalkyl esters which can be employed in the above process are the following:

3-dimethylaminopropyl chloride,
3-diphenylaminopropyl chloride,
2-dibenzylaminoethyl chloride,
2-dicyclohexylaminoethyl bromide,
3-piperidinopropyl chloride,
morpholinoethyl chloride,
pyrrolidinoethyl chloride,
4-methylpiperazinoethyl chloride,
3-(N-methyl-N-benzylamino)propyl chloride,
2-dimethylaminoethyl tosylate,
2-(N-methyl-N-benzylamino)ethyl chloride, and
2-diethylaminoethyl bromide.

Representative of the novel compounds which can be prepared by the above described process are the following:

1-(3'-dimethylaminopropyl)-2,1-benzisothiaozline-2,2-dioxide,
1-(2'-piperidinoethyl)-2,1-benzisothiazoline-2,2-dioxide,
1-(3'-methylbenzylaminopropyl)-2,1-benzisothiazoline-2,2-dioxide,
1-(3'-N-methylpiperazinopropyl)-2,1-benzisothiazoline-2,2-dioxide,
1-(2'-dimethylaminoethyl)-2,1-benzisothiazoline-2,2-dioxide,
1-(2'-morpholinoethyl)-2,1-benzisothiazoline-2,2-dioxide,
1-(2'-methylbenzylaminoethyl)2,1-menzisothiazoline-2,2-dioxide,
1-(3'-diphenylaminoisobutyl)-2,1-benzisothiazoline-2,2-dioxide,
1-(2'-diethylaminoethyl)-2,1-benzisothiazoline-2,2-dioxide,
1-(3'-dibenzylaminopropyl)-2,1-benzisothiazoline-2,2-dioxide,
1-(3'-dimethylaminopropyl)-3-phenyl-2,1-benzisothiazoline-2,2-dioxide,
1-(3'-dimethylaminopropyl)-3-methyl-2,1-benziothiazoline-2,2-dioxide,
1-(3'-methylbenzylaminopropyl)-3-phenyl-2,1-benzisothiazoline-2,2-dioxide,
1-(3'-methylbenzylaminopropyl)-3-cyclopentyl-2,1-benzisothiazoline-2,2-dioxide,
1-(2'-dimethylaminoethyl)-3-phenyl-2,1-benzisothiazoline-2,2-dioxide,
1-(2'-dimethylaminoethyl)-3-benzyl-2,1-benzisothiazoline-2,2-dioxide,
1-(2'-methylbenzylaminoethyl)-3-phenyl-2,1-benzisothiazoline-2,2-dioxide, and
1-(2'-diethylaminoethyl)-3-phenyl-2,1-benzisothiazoline-2,2-dioxide.

The compounds in which Am is

and $R_1$ is hydrogen may be conveniently prepared by subjecting the corresponding compound in which $R_1$ is benzyl and $R_2$ is not hydrogen or benzyl to catalytic cleavage of the benzyl group.

Similarly, the compounds in which Am is

and both $R_1$ and $R_2$ are hydrogen may be prepared by subjecting the corresponding compound in which $R_1$ and $R_2$ are benzyl to catalytic cleavage of the benzyl groups.

The catalytic cleavage of the benzyl group may be readily effected by dissolving the N-mono or dibenzyl derivative in a suitable medium and adding a catalyst, such as palladium on carbon, and hydrogen under pressure, as up to about 100 p.s.i. The cleavage may also be effected by reacting the appropriate benzyl derivative with a chloroformate such as methyl chloroformate, ethyl chloroformate or the like, to form the corresponding N-carboalkoxy derivative, and subjecting that compound to hydrolysis conditions.

Representative of the compounds which may be prepared in the described manner are the following:

1-(3'-methylaminopropyl)-2,1-benzisothiazoline-2,2-dioxide,
1-(3'-aminopropyl)-2,1-benzisothiazoline-2,2-dioxide,
1-(3-methylaminopropyl)-3-phenyl-2,1-benzisothiazoline-2,2-dioxide,
1-(3'-aminopropyl)-3-phenyl-2,1-benzisothiazoline-2,2-dioxide,
1-(2'-ethylaminoethyl)-2,1-benzisothiazoline-2,2-dioxide,
1-(2'-aminoethyl)-2,1-benzisothiazoline-2,2-dioxide, and
1-(2'-aminoethyl)-3-phenyl-2,1-benzisothiazoline-2,2-dioxide.

The compound in which Am is a cyclic amine group may be prepared by treating a halomethanesulfonanilide such as o-chloromethanesulfonanilide with a suitable ester such as a N-substituted heterocyclic halide or a N-substituted heterocyclic alkyl halide in the presence of a suitable base to form the corresponding sulfonanilide. The sulfonanilide may then be treated with a nonparticipating strong base, as previously described, to effect ring closure.

The above process may be diagrammed as follows:

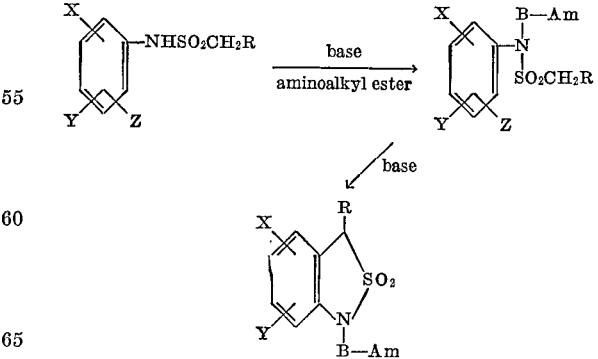

wherein Am is cyclic amine group, B is an alkylene group when it is attached to the carbon adjacent to a heterocyclic atom, and X and Y are groups which do not partake in or interfere with the reaction.

Representative of the esters which may be employed in the above process are the following:

N-methyl-3-chloropiperidine,
N-ethyl-4-bromopiperidine,
N-benzyl-3-chloropiperidine, N-benzyl-4-chloropiperidine,
N-phenylpropyl-3-bromopiperidine,
N-methyl-3-chloropyrrolidine,
N-benzyl-3-bromopyrrolidine,
N-isopropyl-4-bromopyrrolidine,
N-phenylisopropyl-3-pyrrolidine,
N-(beta-diethylaminoethyl)-3-chloropiperidine,
N-(dimethylaminoethyl)-4-bromopiperidine,
3-chloroquinuclidine,
N-methyl-2-(2-chloroethyl)piperidine,
N-ethyl-3-chloromethylpiperidine,
N-benzyl-4-(3-bromopropyl)piperidine,
N-ethyl-2-(2-chloroethyl)pyrrolidine, and
N-benzyl-3-chloromethylpyrrolidine, Representative of the compounds which may be formed by the above process are the following:

1-(N-methyl-4'-piperdyl)-2,1-benzisothiazoline-2,2-dioxide,
1-(N-ethyl-3'-piperdyl)-2,1-benzisothiazoline-2,2-dioxide,
1-(N-benzyl-3'-piperdyl)-2,1-benzisothiazoline-2,2-dioxide,
1-(N-ethyl-3'-pyrrolidyl)-2,1-benzisothiazoline-2,2-dioxide,
1-(N-benzyl-3'-pyrrolidylmethyl)-2,1-benzisothiazoline-2,2-dioxide, and
1-(N-phenethyl-3'-pyrrolidyl)-2,1-benzisothiazoline-2,2-dioxide.

The compounds in which Am is a heterocyclic group containing a secondary nitrogen in the ring can be produced by subjecting the corresponding compounds containing a benzyl group on the nitrogen of the heterocyclic group to catalytic reductive cleavage to remove the benzyl group.

The catalytic reductive cleavage of the benzyl group is readily effected by adding the appropriate N-benzyl piperidyl or pyrrolidyl derivative, advisably as an acid addition salt, to a solvent such as water or a lower alcohol, adding a catalyst such as palladium and hydrogen under pressure, as up to about 100 p.s.i. A small amount of glacial acetic acid is generally included to promote the reaction. The hydrogenation proceeds quickly and its progress can be measured by the hydrogen uptake. When the hydrogen uptake ceases the reaction can be considered completed. After filtering the reaction mixture it can be evaporated to dryness and the product triturated with a solvent such as ether and separated by filtration.

Representative of the compounds which may be formed in this manner are the following:

1-(4'-piperidyl)-2,1-benzisothiazoline-2,2-dioxide,
1-(3'-piperidyl)-2,1-benzisothiazoline-2,2-dioxide,
1-(3'-pyrrolidyl)-2,1-benzisothiazoline-2,2-dioxide,
1-[3'-(2-pyrrolidyl)propyl]-2,1-benzisothiazoline-2,2-dioxide, and
1-[2-(4-piperidyl)ethyl]-2,1-benzisothiazoline-2,2-dioxide.

The compounds in which X and Y are other than hydrogen are preferably prepared by using conventional nitration, chlorination and the like, techniques to place the ring substituent into the 1-substituted-2,1-benzisothiazoline-2,2-dioxide. For example, chlorine may be inserted into the 5 position by treating a 1-substituted-2,1-benzisothiazoline-2,2-dioxide with N-chlorosuccinimide in dimethylformamide.

Acid addition salts of the compounds of the present invention may be conveniently prepared by contacting the compounds with a suitable acid such as formic acid, citric acid, maleic acid, sulfuric acid, hydrochloric acid, succinic acid, tartaric acid, benzoic acid or fumaric acid.

The thiocyanic acid addition salts of the compounds of this invention when condensed with formaldehyde form resinous materials useful as pickling agents according to U.S. Pats. 2,425,320 and 2,606,155. The compounds also form fluosilicic acid addition salts which are useful as moth proofing agents according to U.S. Pats. 1,915,334 and 2,075,359.

The novel compounds of this invention are pharmacologically active, for example, compounds 1-(2-N,N-dimethylaminoethyl)-2,1-benzisothiazoline - 2,2 - dioxide, 1-(3'-dimethylaminopropyl) - 3 - phenyl - 2,1-benzisothiazoline-2,2-dioxide, 1-(3' - methylaminopropyl) - 2,1-benzisothiazoline-2,2-dioxide and 1-(2'-N - methyl - N-benzylaminoethyl)-2,1-benzisothiazoline - 2,2 - dioxide when administered intraperitoneally at doses of 10 to 100 mg./kg. to mice have produced behavioral profiles resembling those obtained with known central nervous system stimulants. The animals exhibited increased vocalization, restlessness, irritability, pinna reflex, touch response, struggle response and startle response. The behavioral studies which also established that the compounds had $LD_{50}$'s in excess of 125 mg./kg. intraperitoneally were conducted in accord with the procedure outlined by S. Irwin in "Animal and Clinical Pharmacologic Techniques in Drug Evaluation," J. H. Nodine and P. E. Siegler, ed., Year Book Medical Publishers, Inc. 1964.

The compounds 1-(2-N,N-dimethylaminoethyl) - 2,1-benzisothiazoline - 2,2 - dioxide and 1-(3 - N-methyl-N-benzylaminopropyl)-2,1-benzisothiazoline-2,2-dioxide also demonstrated the ability to lower blood pressure 10–25% in the standard vagotomized, sodium pentobarbital anesthetized dog preparation when administered intravenously in doses of 1 to 10 mg./kg. of body weight.

The compounds are preferably combined with one or more suitable pharmaceutical diluents and formed into unit dosage forms such as tablets, capsules or solutions. Such dosage forms provide suitable means for oral and parenteral administration.

The following examples are presented to illustrate this invention.

EXAMPLE 1

N-(2-dimethylaminoethyl)-o-chloromethanesulfonanilide hydrochloride

To a stirred suspension of sodium amide (15.6 g., 0.4 mole) in 200 ml. of dimethylformamide under nitrogen is added dropwise a solution of o-chloromethanesulfonanilide (81 g., 0.4 mole) in dimethylformamide (200 ml.). After being heated at 100° for 8 hrs., the cooled mixture is treated with a solution of dimethylaminoethyl chloride (0.44 mole) in 200 ml. ether. The ether is removed by distillation, and the reaction mixture kept near 100° overnight. After dilution with 2 liters of water, the crude product is extracted with three 500-ml. portions of ether, which are combined and extracted with three 200-ml. portions of 5% hydrochloric acid. The combined acidic solution is made alkaline and extracted with four 250-ml. portions of ether, which are combined and dried. Solvent evaporation provides an oil, which is treated with ethereal hydrogen chloride to give the desired product. After one recrystallization from 2 - propanol, N - (2-dimethylaminoethyl) - o - chloromethanesulfonanilide hydrochloride is obtained in the form of colorless rods which melt at 213–216°.

*Analysis.*—Calcd. for $C_{11}H_{18}Cl_2N_2O_2S$ (percent): Cl, 11.32; N, 8.94; S, 10.23. Found (percent): Cl, 11.38; N, 9.00; S, 10.36.

EXAMPLE 2

1-(2'-dimethylaminoethyl)-2,1-benzisothiazoline-2,2-dioxide

To a well-stirred mixture of 0.15 mole potassium amide in 500 ml. of liquid ammonia under nitrogen is added in 10 minutes a solution of 9.9 g. (0.036 mole) of the sulfonanilide of Example 1 in 20 ml. of anhydrous ether. After 2 hrs., the reaction is quenched by the addition of 7 g. (0.12 mole) of solid ammonium chloride, and the ammonia allowed to evaporate. The residue is treated with 200 ml. of water, and the organic material taken up in three 100-ml. portions of benzene, which are combined and extracted with two 100-ml. portions of 10% hydrochloric acid. The acidic solution is made alkaline and extracted with three 75-ml. portions of benzene, which are combined and dried. Solvent evaporation provides an oil which solidifies on standing, and recrystallization from chloroform-petroleum ether provides 1 - (2' - dimethylaminoethyl) - 2,1 - benzisothiazoline-2,2-dioxide in the form of a light yellow powder, M.P. 44–46.5°.

Analysis.—Calcd. for $C_{11}H_{16}N_2O_2S$ (percent): C, 54.98; H, 6.71; S, 13.34. Found (percent): C, 55.15; H, 6.98; S, 13.40.

EXAMPLE 3

α-Toluenesulfon-o-chloroanilide

A solution of 9.5 g. (0.05 mole) of α-toluenesulfonyl chloride in 10 ml. of dimethylformamide is added dropwise to a cooled solution of 6.4 g. (0.05 mole) of o-chloroaniline and 4.0 g. (0.05 mole) of pyridine in 15 ml. of dry benzene. The reaction mixture is stirred at room temperature for 18 hrs., then diluted with 50 ml. of water and 30 ml. of benzene. The aqueous layer is extracted with three 50-ml. portions of benzene. The benzene extracts are combined and extracted with two 50-ml. portions of 10% hydrochloric acid and four 200-ml. portions of 3% sodium hydroxide. The alkaline solutions are combined, acidified with concentrated hydrochloric acid, and extracted with three 100-ml. portions of benzene, which are combined, dried, and evaporated. Recrystallization of the residual solids from 20% aqueous 2-propanol affords α-toluenesulfon-o-chloroanilide in the form of white plates, M.P. 65–68°.

Analysis.—Calcd. for $C_{13}H_{12}ClNO_2S$ (percent): C, 55.61; H, 4.31. Found (percent): C, 55.34; H, 4.18.

EXAMPLE 4

N-(3-dimethylaminopropyl)-α-toluenesulfon-o-chloroanilide hydrochloride

A mixture of 31 g. (0.11 mole) of α-toluenesulfon-o-chloroanilide and 4.5 g. (0.12 mole) of sodamide in 100 ml. of dimethylformamide is heated under nitrogen on a steam bath for 4 hours and then treated with 0.14 mole of 3-dimethylaminopropyl chloride in ether. The ether is distilled, and the reaction mixture heated at 95° overnight. The work-up procedure is identical to that described in Example 1. The crude product was converted to a hydrochloride, M.P. 190–193°. After recrystallization from 2-propanol, N - (3 - dimethylaminopropyl)-α-toluenesulfon-o-chloroanilide hydrochloride is obtained in the form of a white, crystalline powder.

Analysis.—Calcd. for $C_{18}H_{24}Cl_2N_2O_2S$ (percent): C, 53.59; H, 6.00; S, 7.93. Found (percent): C, 53.53; H, 5.82; S, 7.87.

EXAMPLE 5

1-(3'-dimethylaminopropyl)-3-phenyl-2,1-benzisothiazoline-2,2-dioxide

The sulfonanilide of Example 4 (7 g., 0.02 mole), as the free base, in 15 ml. of dry ether is added under nitrogen to a stirred solution of potassium amide from 3.2 g. (0.08 g.-atom) of potassium in 280 ml. of liquid ammonia. After 1 hour, the reaction is quenched with solid ammonium chloride (3.5 g.), and the ammonia allowed to evaporate. The residue is treated with 100-ml. portions of benzene and water. The aqueous layer is separated and extracted with two additional 50-ml. portions of benzene. The combined benzene solutions are washed with three 75-ml. portions of 10% HCl, which are then also combined, made alkaline with solid NaOH, and extracted three times with benzene (75 ml.). The combined benzene solution is dried and evaporated. Careful elution of the residual oil from 250 g. of alumina with benzene-ether (4:1) gave 1 - (3' - dimethylaminopropyl)-3-phenyl-2,1- benzisothiazoline-2,2-dioxide in the form of a yellow viscous oil.

Analysis.—Calcd. for $C_{18}H_{22}N_2O_2S$ (percent): C, 65.41; H, 6.71; S, 9.71. Found (percent): C, 65.75; H, 6.15; N, 9.64.

EXAMPLE 6

N-(3-methylbenzylaminopropyl)-o-chloromethanesulfonanilide hydrochloride

This material is synthesized from 54.1 g. (0.25 mole) of o-chloromethanesulfonanilide, 9.75 g. (0.25 mole) of sodamide, and 54.2 g. (0.275 mole) of N-methyl-N-benzylaminopropylchloride in 200 ml. of dimethylformamide as described in Example 1. Conversion of the base to its hydrochloride salt, followed by recrystallization from methanol-ether, gives N-(3-methylbenzylaminopropyl)-o-chloromethanesulfonanilide hydrochloride in the form of a white powder, M.P. 177.5–181°.

Analysis.—Calcd. for $C_{18}H_{24}Cl_2N_2O_2S$ (percent): C, 53.59; H, 5.99; N, 6.94; S, 7.93. Found (percent): C, 53.62; H, 5.97; N, 6.73; S, 8.18.

EXAMPLE 7

1-(3'-methylbenzylaminopropyl)-2,1-benzisothiazoline-2,2-dioxide hydrochloride

A solution of the compound of Example 6 (9.3 g., 0.025 mole) in 100 ml. of dry ether is added dropwise to a well-stirred solution of potassium amide (0.1 mole) in 600 ml. of liquid ammonia. The reaction mixture is stirred under nitrogen for 1 hour and then quenched with solid ammonium chloride. After evaporation of the ammonia, the residue is treated with 250 ml. of water and 250 ml. of benzene. The benzene layer is washed with three 100-ml. portions of 10% HCl, which are combined, made alkaline with solid NaOH, and extracted with benzene. The dried solvent is evaporated to give an oil which is eluted from 125 g. of silica gel with benzene-ether (1:2). Treatment of the product with ethereal HCl gives 1-(3'-methylbenzylaminopropyl)-2,1-benzisothiazoline - 2,2 - dioxide hydrochloride in the form of white granules, M.P. 121–123° after recrystallization from isopropanol-ether.

Analysis.—Calcd. for $C_{18}H_{23}ClN_2O_2S$ (percent): C, 58.92; H, 6.32; N, 7.63. Found (percent): C, 59.06; H, 6.46; N, 7.63.

EXAMPLE 8

1-(3'-methylaminopropyl)-2,1-benzisothiazoline-2,2-dioxide hydrochloride

A solution of the hydrochloride of Example 7 (5.1 g., 0.014 mole) in 220 ml. of absolute ethanol is treated with hydrogen at 24° and 174 lbs. in the presence of 0.8 g. of 10% palladium on carbon. The theoretical uptake is realized in 3 hours, and the mixture is filtered. Evaporation of the filtrate provides a gummy residue which is treated with 40 ml. of 5% NaOH. The insoluble oil is taken up in ether which was washed with brine, dried, and evaporated. The remaining oil is allowed to react with ethereal HCl, and the resulting solid recrystallized from ethanol to give 1-(3'-methylaminopropyl) - 2,1 - benzisothiazoline-2,2-dioxide hydrochloride in the form of white needles, M.P. 149–150°.

Analysis.—Calcd. for $C_{11}H_{17}ClN_2O_2S$ (percent): C, 47.73; H, 6.19; N, 10.12. Found (percent): C, 47.98; H, 6.35; N, 10.06.

EXAMPLE 9

N-(2-methylbenzylaminoethyl)-o-chloromethanesulfonanilide hydrochloride

This material is synthesized from 51.9 g. (0.25 mole) of o-chloromethanesulfonanilide, an equivalent amount of sodamide, and 0.275 mole of N-methyl-N-benzylaminoethyl chloride in 400 ml. of dimethylformamide. The crude base affords N-(2-methylbenzylaminoethyl)-o-chloromethanesulfonanilide in the form of a hydrochloride salt which melts at 191–195.5°.

*Analysis.*—Calcd. for $C_{17}H_{22}Cl_2N_2O_2S$ (percent): C, 52.44; H, 5.69; N, 7.19; S, 8.23. Found (percent): C, 52.46; H, 5.80; N, 6.96; S, 8.14.

EXAMPLE 10

1-(2'-methylbenzylaminoethyl)-2,1-benzisothiazoline-2,2-dioxide

A solution of the compound of Example 9 (17.6 g., 0.05 mole), as the free base, in 150 ml. of dry ether is added dropwise to a well-stirred solution of potassium amide (0.2 mole) in 700 ml. of liquid ammonia. The reaction mixture is stirred under nitrogen for 30 minutes and then is quenched with solid $NH_4Cl$. The work-up procedure described in Example 6 is repeated to yield 11 g. of crude product which was eluted from 250 g. of silica gel with benzene-ether (2:1). The product is isolated as an oil which readily solidified on standing. Recrystallization from cyclohexane-benzene (2:1) gives 1-(2'-methylbenezylaminoethyl) - 2,1 - benzisothiazoline-2,2-dioxide in the form of white needles, M.P. 91–92.5°.

*Analysis.*—Calcd. for $C_{17}H_{20}N_2O_2S$ (percent): S, 64.53; H, 6.37; N, 8.86. Found (percent): C, 64.83; H, 6.40; N, 8.84.

EXAMPLE 11

1-(2'-methylaminoethyl)-2,1-benzisothiazoline-2,2-dioxide hydrochloride

A suspension of 10% palladium on carbon in a solution of ethanol (120 ml.)-methanol (100 ml.) containing 5.55 g. (0.0157 mole) of the compound of Example 10 is treated with hydrogen at 23° and 385 p.s.i. The theoretical uptake is complete after 1 hr., and the mixture is filtered. Evaporation of the filtrate provides 1-(2'-methylaminoethyl)-2,1-benzisothiazoline-2,2-dioxide hydrochloride in the form of a yellow solid, which melted at 194–195° after recrystallization from ethanol-methanol as white plates.

*Analysis.*—Calcd. for $C_{10}H_{15}ClN_2O_2S$ (percent): C, 45.71; H, 5.75; N, 10.66. Found (percent): C, 45.92; H, 5.68; N, 10.62.

We claim:

1. A compound selected from the class consisting of a compound of the formula

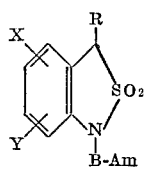

in which X and Y are hydrogen, alkyl of 1 to 4 carbon atoms, nitro, alkoxy of 1 to 3 carbon atoms, halogen or $CF_3$; R is hydrogen, alkyl of 1 to 4 carbon atoms or phenyl; B is an alkylene of 1 to 6 carbon atoms, Am is

in which $R_1$ and $R_2$ may be hydrogen, alkyl of 1 to 8 carbon atoms or phenyl alkyl in which the alkyl group contains 1 to 4 carbon atoms and pharmaceutically acceptable acid addition salts thereof.

2. A compound of claim 1 in which X and Y are hydrogen, B is ethylene, propylene or isopropylene and $R_1$ and $R_2$ are hydrogen, alkyl of 1 to 8 carbon atoms or benzyl.

3. A compound of claim 1 in which X and Y are hydrogen, B is ethylene or propylene, R is hydrogen or phenyl and $R_1$ and $R_2$ are alkyl of 1 to 8 carbon atoms.

4. A compound of claim 1 in which X and Y are hydrogen, B is ethylene, R is hydrogen and $R_1$ and $R_2$ are methyl.

5. A compound of claim 1 in wnich X and Y are hydrogen, B is propylene, R is phenyl and $R_1$ and $R_2$ are methyl.

6. A compound of claim 1 in which X and Y are hydrogen, B is propylene, R is hydrogen, $R_1$ is benzyl and $R_2$ is methyl.

7. A compound of claim 1 in which X and Y are hydrogen, B is propylene, R is hydrogen, $R_1$ is hydrogen and $R_2$ is methyl.

8. A compound of claim 1 in which X and Y are hydrogen, B is ethylene, R is hydrogen, $R_1$ is benzyl and $R_2$ is methyl.

9. A compound of claim 1 in which X and Y are hydrogen, B is ethylene, R is hydrogen, $R_1$ is hydrogen and $R_2$ is methyl.

No references cited.

ALEX MAZEL, Primary Examiner

J. H. TURNIPSEED, Assistant Examiner

U.S. Cl. X.R.

252—380; 260—247.1, 268, 288, 293.4; 424—248, 252 267, 270